US00RE41700E

(19) United States
(12) Reissued Patent
Viklund et al.

(10) Patent Number: US RE41,700 E
(45) Date of Reissued Patent: Sep. 14, 2010

(54) OUTLET ACCOMMODATING OUT-OF-SPECIFICATION PLUGS

(75) Inventors: Mark Viklund, New Milford, CT (US); Denny Lo, Bethlehem, CT (US); Maxwell Yip, Trumbull, CT (US); John A. Siemon, Woodbury, CT (US); Kevin J. Audibert, Wolcott, CT (US)

(73) Assignee: The Siemon Company, Watertown, CT (US)

(21) Appl. No.: 11/726,405

(22) Filed: Mar. 21, 2007

Related U.S. Patent Documents

Reissue of:
(64) Patent No.: 6,869,318
Issued: Mar. 22, 2005
Appl. No.: 10/406,746
Filed: Apr. 3, 2003

U.S. Applications:
(60) Provisional application No. 60/370,042, filed on Apr. 4, 2002.

(51) Int. Cl.
*H01R 24/00* (2006.01)

(52) U.S. Cl. ..... 439/676; 439/682

(58) Field of Classification Search ..... 439/676, 439/884, 682
See application file for complete search history.

(56) References Cited

U.S. PATENT DOCUMENTS

| | | | | | |
|---|---|---|---|---|---|
| 4,790,773 | A | * | 12/1988 | Hahn | 439/474 |
| 5,478,261 | A | * | 12/1995 | Bogese, II | 439/676 |
| 6,083,052 | A | * | 7/2000 | Adams et al. | 439/676 |
| 6,126,476 | A | * | 10/2000 | Viklund et al. | 439/404 |
| 6,213,809 | B1 | * | 4/2001 | Viklund | 439/418 |
| 6,547,604 | B2 | * | 4/2003 | Arnett et al. | 439/676 |
| 2002/0055303 | A1 | * | 5/2002 | Belopolsky et al. | 439/676 |
| 2003/0129880 | A1 | * | 7/2003 | Arnett et al. | 439/676 |

* cited by examiner

*Primary Examiner*—Xuong M Chung-Trans
(74) *Attorney, Agent, or Firm*—Cantor Colburn LLP

(57) ABSTRACT

A telecommunications outlet includes: a housing that is shaped to receive a plug, the housing having a support disposed within the housing; and a first contact having a first end, a second end, and a bend section, the bend section is supported by the support, wherein the first contact includes a first reverse curve section disposed between the first end and the bend section.

18 Claims, 10 Drawing Sheets

OUTLET ACCOMMODATING OUT-OF-SPECIFICATION PLUGS

Matter enclosed in heavy brackets [ ] appears in the original patent but forms no part of this reissue specification; matter printed in italics indicates the additions made by reissue.

CROSS-REFERENCE TO RELATED APPLICATIONS

The present application claims the benefit of the date of the earlier filed provisional application, having U.S. Provisional Application No. 60/370,042, filed on Apr. 4, 2002, which is incorporated herein in its entirety.

BACKGROUND OF THE INVENTION

The invention relates generally to modular outlets and in particular to a modular outlet that accommodates an out-of-specification plug. Modular outlets are used in a variety of applications such as patch panels, couplers, etc. Modular outlets typically include a number of resilient metal contacts the make electrical contact with contacts on a plug. The outlet contacts typically deflect slightly upon mating with a plug meeting certain specifications. When an out-of-specification plug is mated with an outlet, this may cause the outlet contacts to bend and/or deform. Such deformation may cause the outlet to fail to make contact with a subsequent plug resulting in an open circuit failure.

SUMMARY OF THE INVENTION

A telecommunications outlet includes: a housing that is shaped to receive a plug, the housing having a support disposed within the housing; and a first contact having a first end, a second end, and a bend section, the bend section is supported by the support, wherein the first contact includes a first reverse curve section disposed between the first end and the bend section.

BRIEF DESCRIPTION OF THE DRAWINGS

Referring now to the drawings wherein like elements are numbered alike in the several FIGURES.

DETAILED DESCRIPTION

Figure 1:
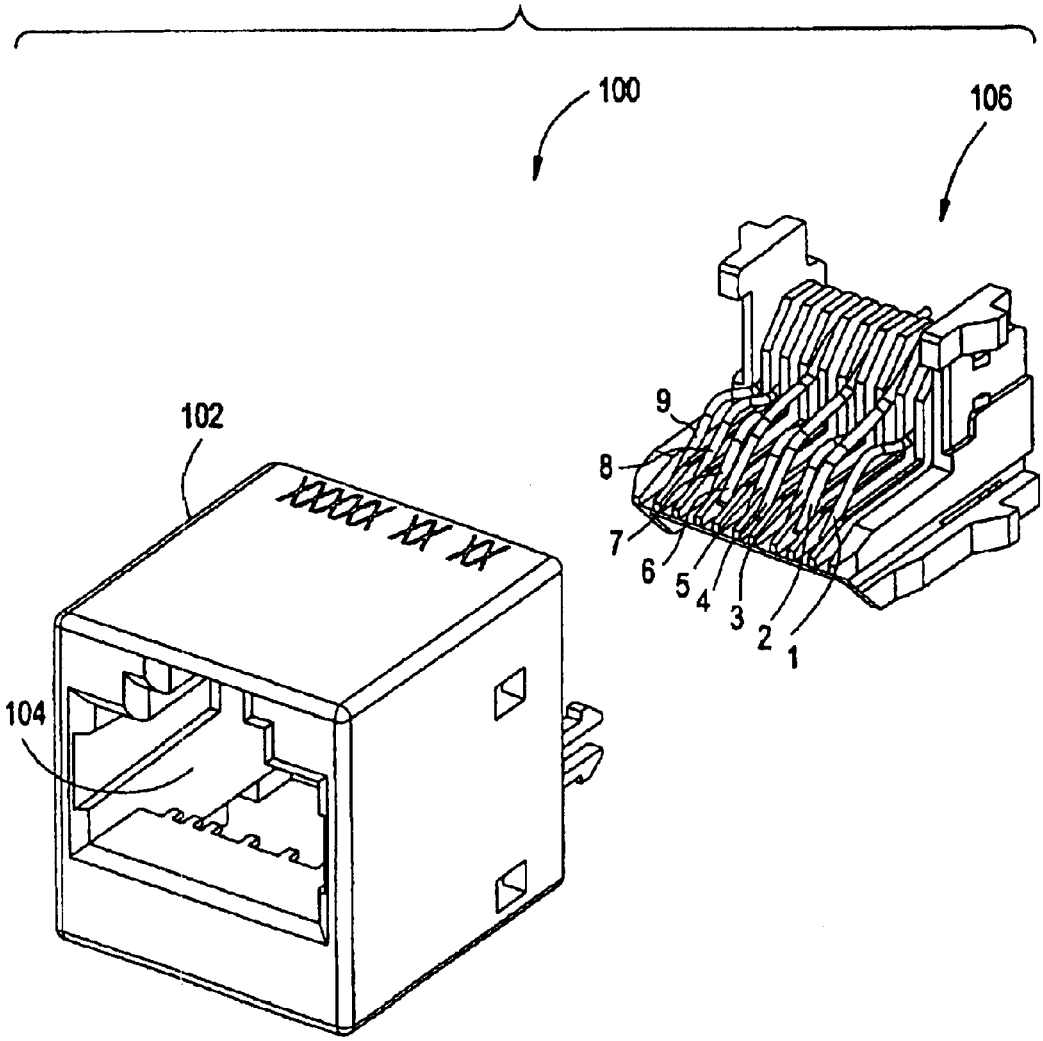
FIG. 1 is an exploded perspective view of an outlet with no plug.
Figure 2:
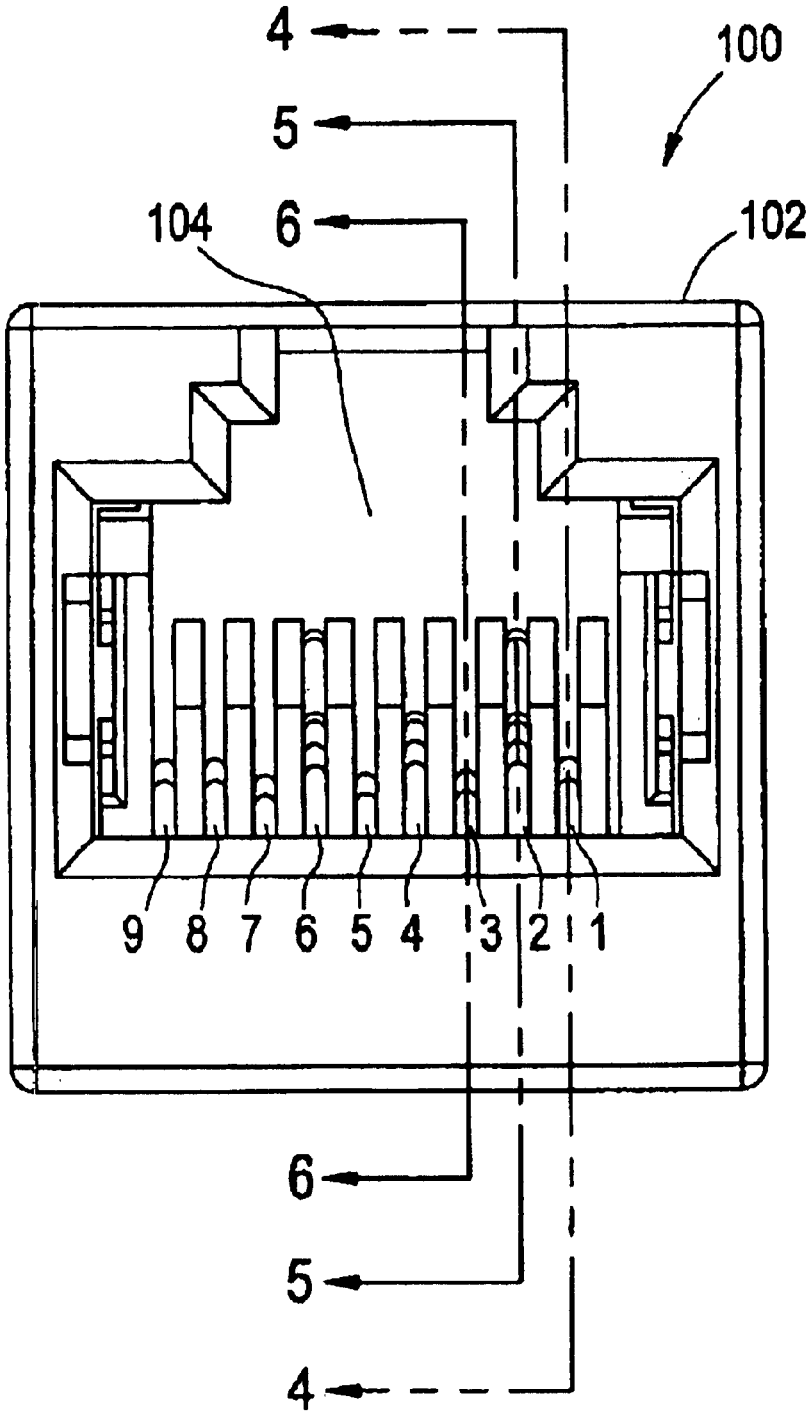
FIG. 2 is a front view of the outlet of FIG. 1.
Figure 3:
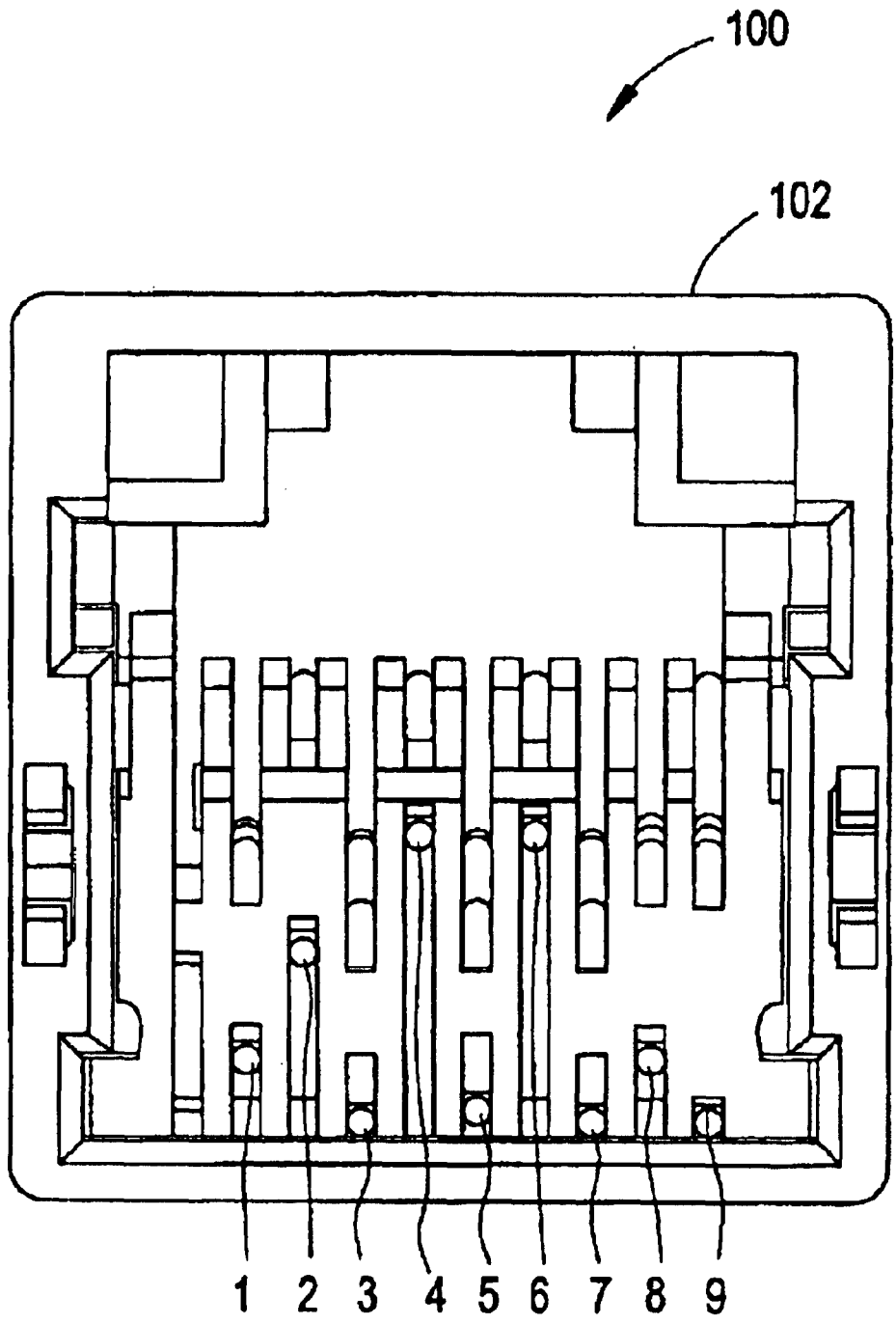
FIG. 3 is a back view of the outlet of FIG. 1.

FIG. 1 is an exploded perspective view of an outlet 100 having a housing 102 and a front opening 104. The front opening 104 receives a standard plug as known in the art. Outlet 100 includes a contact section 106, which includes nine contacts, which are numbered 1–9. While outlet 100 is shown with nine contacts, there may also be only eight contacts. The contacts commonly form tip and ring pairs. In one embodiment, contacts 1 and 2 form a tip and ring pair, contacts 3 and 6 form a tip and ring pair, contacts 4 and 5 form a tip and ring pair, contacts 7 and 8 form a tip and ring pair. In addition, FIGS. 2 and 3 illustrate the front view and the back view of outlet 100, respectively. A more detailed description of the back view of outlet 100 can also be found in FIGS. 37–42 and its related description in the specification of U.S. Pat. No. 6,213,809, which is herein incorporated by reference in its entirety.

Figure 4:
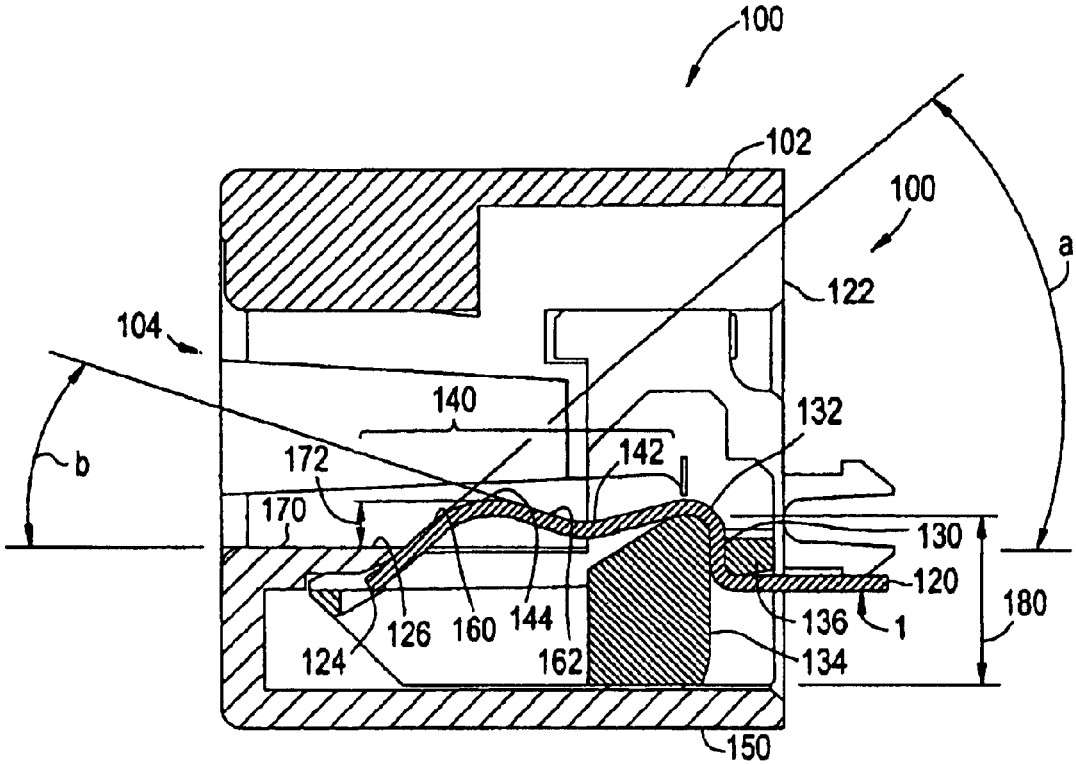
FIG. 4 is a cross sectional view of the outlet of FIG. 1, shown at a first contact position.

FIG. 4 is a cross sectional view of outlet 100 taken at contact 1. Contact 1 includes a termination end 120 that exits a rear 122 of housing 102 and a distal end 124 that is secured within housing 102 by placing distal end 124 under a front lip 126 of housing 102. Termination end 120 may be a solder tail, press-fit tail, etc. From termination end 120, contact 1 bends from the horizontal direction to the vertical direction, which is approximately 90 degrees, to define a first leg 130. Contact 1 then bends again at a bend section 132 and proceeds to a reverse curve section 140. A support 134 formed within housing 102 supports first leg 130 and bend section 132. In addition, an extension 136 extends from housing 102 to also support first leg 130.

Alternatively, termination end 120 may extend from a bottom 150 of housing 102. In this embodiment, termination end 120 proceeds in a vertical direction along support 134 and then bends at bend section 132 to reverse curve section 140.

Reverse curve section 140 includes a concave portion 142 and a convex portion 144. Concave portion 142 is formed closer to termination end 120 than convex section 144. Convex section 144 is formed closer to a distal end 124 than concave portion 142.

Convex portion 144 includes a first slope 160 and a second slope 162. Both first slope 160 and second slope 162 may be defined by angles a and b, respectively, which are formed from the horizontal direction. The horizontal direction is defined at a bottom floor 170 of opening 104. As can be seen in FIG. 4, the orientation of angle a and angle b are from opposite directions. Angle a, which is oriented from the rear of outlet 100, may range up to and including an angle of 45°, with a preferable angle of 45°. Angle b, which is oriented from the front of outlet 100, may range from 12° to 20°, with a preferable angle of 19°. In addition, a height 172 of convex portion 144 from bottom floor 170 may range from about 0.8 inches to about 1.05 inches, with a preferable height of approximately 0.92 inches.

It should be noted that a height 180 of support 134 may be adjusted to accommodate the various angles. In addition, height 180 may remain constant and the change in the angles may be made by changing the bend of reverse curve section 140. In addition, at the preferred angles of 45° and 19° for angles a and b, respectively, height 180 extends above bottom floor 170.

Within outlet 100, contacts 1, 8, and 9 are the same structure and thus, the description described as to contact 1 also applies to contacts 8 and 9.

Figure 5:
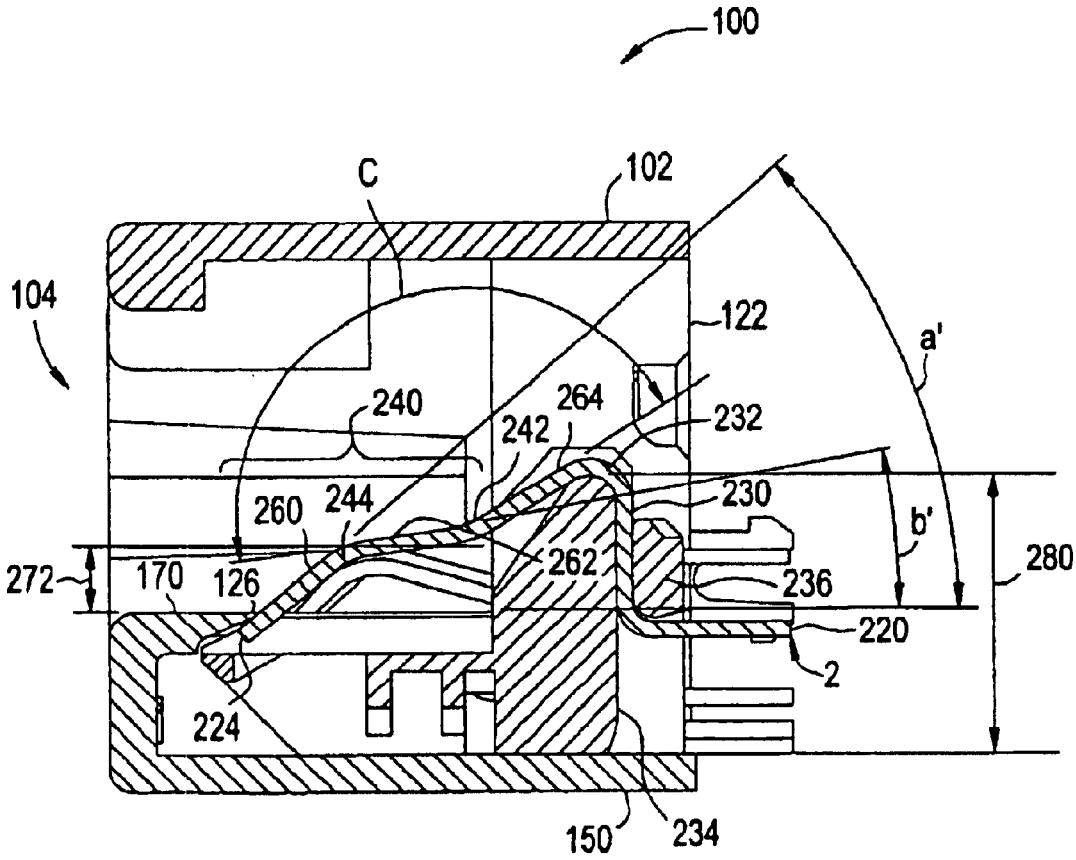
FIG. 5 is a cross sectional view of the outlet of FIG. 1, shown at a second contact position.

FIG. 5 is a cross sectional view of outlet 100 taken at contact 2. Contact 2 includes a termination end 220 that exits rear 122 of housing 102 and a distal end 224 that is secured within housing 102 by placing distal end 224 under front lip 126 of housing 102. Termination end 220 may be a solder tail, press-fit tail, etc. From termination end 220, contact 2 bends from the horizontal direction to the vertical direction, which is approximately 90 degrees, to define a first leg 230. Contact 2 then bends again at a bend section 232 and proceeds to a reverse curve section 240. A support 234 formed within housing 102 supports first leg 230 and bend section 232. In addition, an extension 236 extends from housing 102 to also support first leg 230.

Alternatively, termination end 220 may extend from bottom 150 of housing 102. In this embodiment, termination end 220 proceeds in a vertical direction along support 234 and then bends at bend section 232 to reverse curve section 240.

Reverse curve section 240 includes a concave portion 242 and a convex portion 244. Concave portion 242 is formed closer to termination end 220 than convex section 244. Convex section 244 is formed closer to a distal end 224 than concave portion 242.

Convex portion 244 includes a first slope 260 and a second slope 262. Concave portion 242 includes second slope 262 and a third slope 264. Both first slope 260 and second slope 262 may be defined by angles a' and b', respectively, which are formed from the horizontal direction. The horizontal direction is defined at bottom floor 170 of opening 104. As can be seen in FIG. 5, angles a' and b' are both oriented in the same direction. Angle a', which is oriented from the rear of outlet 100, may range up to and including an angle of 45°, with a preferable angle of 45°. Angle b', which is also oriented from the rear of outlet 100, may range from 7° to 12°, with a preferable angle of 9.5°. Convex portion 242 may also be defined by an angle c, which defines the angle between second slope 262 and third slope 264. Angle c preferably has a maximum angle of 163°.

In addition, a height 272 of convex portion 244 from bottom floor 170 may range from about 0.85 inches to about 1.15 inches, with a preferable height of approximately 0.92 inches.

It should be noted that a height 280 of support 234 may be adjusted to accommodate the various angles. In addition, height 280 may remain constant and the change in the angles may be made by changing the bend of reverse curve section 240. At the preferred angles of 45° and 9.5° for angles a' and b', respectively, height 280 extends above bottom floor 170. In addition, height 280 is greater than height 180.

Within outlet 100, contacts 2, 4, and 6 are the same structure and thus, the description described as to contact 2 also applies to contacts 4 and 6.

Figure 6:
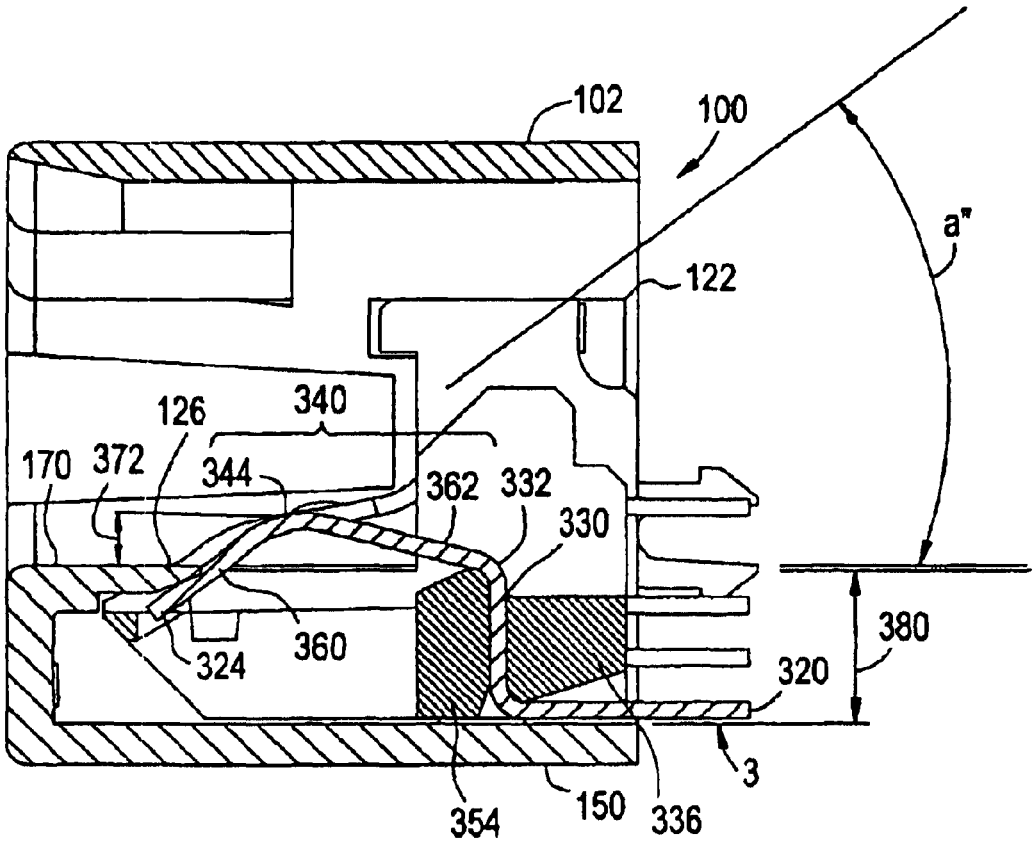
FIG. 6 is a cross sectional view of the outlet of FIG. 1, shown at a third contact position.

FIG. 6 is a cross sectional view of outlet 100 taken at contact 3. Contact 3 includes a termination end 320 that exits rear 122 of housing 102 and a distal end 324 that is secured within housing 102 by placing distal end 324 under front lip 126 of housing 102. Termination end 320 may be a solder tail, press-fit tail, etc. From termination end 320, contact 3 bends from the horizontal direction to the vertical direction, which is approximately 90 degrees, to define a first leg 330. Contact 3 then bends again at a bend section 332 and proceeds to a curve section 340. A support 334 fanned within housing 102 supports first leg 330 and bend section 332. In addition, an extension 336 extends from housing 102 to also support first leg 330.

Alternatively, termination end 320 may extend from bottom 150 of housing 102. In this embodiment, termination end 320 proceeds in a vertical direction along support 334 and then bends at bend section 332 to reverse curve section 340.

Curve section 340 includes a convex portion 344. Convex portion 344 includes a first slope 360 and a second slope 362. First slope 360 may be defined by angle a", which is formed from the horizontal direction. The horizontal direction is defined at bottom floor 170 of opening 104. Angle a", which is oriented from the rear of outlet 100, may range up to and including an angle of 45°, with a preferable angle of 45°. In addition, a height 372 of convex portion 344 from bottom floor 170 may range from about 0.80 inches to about 1.07 inches, with a preferable height of approximately 0.83 inches.

It should be noted that a height 380 of support 334 maybe adjusted to accommodate the various angles. In addition, height 380 may remain constant and the change in the angles may be made by changing the bend of curve section 340. At the preferred angle of 45° for angle a", height 380 does not extend above bottom floor 170. In addition, height 380 is less than both height 180 and 280.

Within outlet 100, contacts 3, 5, and 7 are the same structure and thus, the description described as to contact 3 also applies to contacts 5 and 7.

Contacts 1–9 having reverse curve or curve sections 140, 240, and 340 allow outlet 100 to mate with both in-specification and out-of-specification plugs without damaging contacts 1–9.

Figure 7:
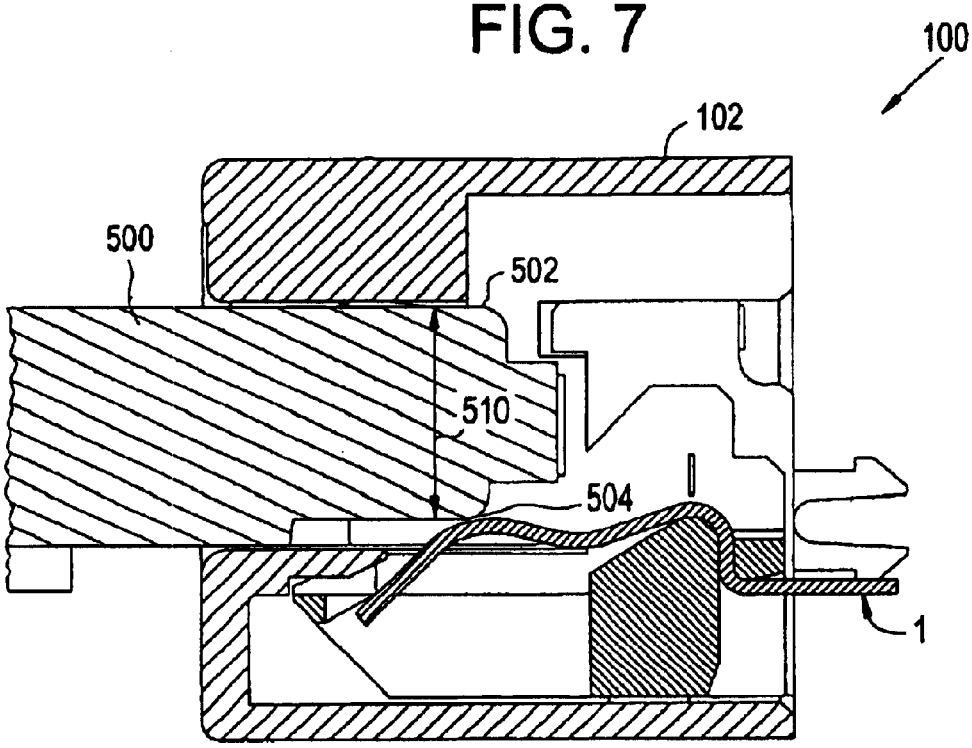
FIG. 7 is a cross sectional view of the outlet of FIG. 1 at the first contact position receiving an in-specification 8 position plug.

FIG. 7 depicts a cross sectional view of an in-specification, 8 position plug 500 being mated with outlet 100 at contact 1. It should be noted that plug 500 has plug contacts 1–8 that align with all contacts 1–8 in outlet 100, but that FIG. 7 only shows plug contact 1 with contact 1 of outlet 100. Plug 500 has a thickness 510 measured from a plug top 502 to a plug bottom 504 of 0.232 inches. Plug bottom 504 is also the contact surface for contact 1.

Figure 8:
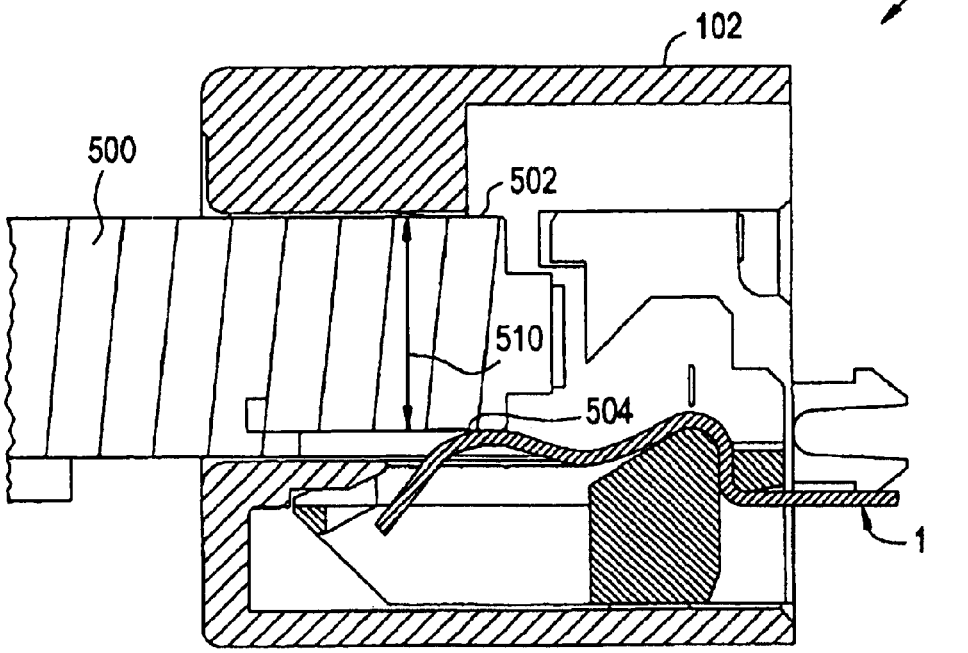
FIG. 8 is a cross sectional view of the outlet of FIG. 1 at the first contact position receiving an in-specification 8 position plug.

FIG. 8 is a similar cross sectional view depicting plug 500 having a thickness 510 of 0.242 inches between plug top 502 and plug bottom 504. The variation in the thickness between plug top 502 and plug bottom 504 may be due to crimp variations in terminating plug 500. When plug 500 is assembled, either in the field or by a manufacturer, the plug contacts are crimpled in the plug housing to make electrical contact with wires in the plug. Different crimping tools and/or pressure will result in a variance in the distance between the plug top 502 and plug bottom 504.

Figure 9:
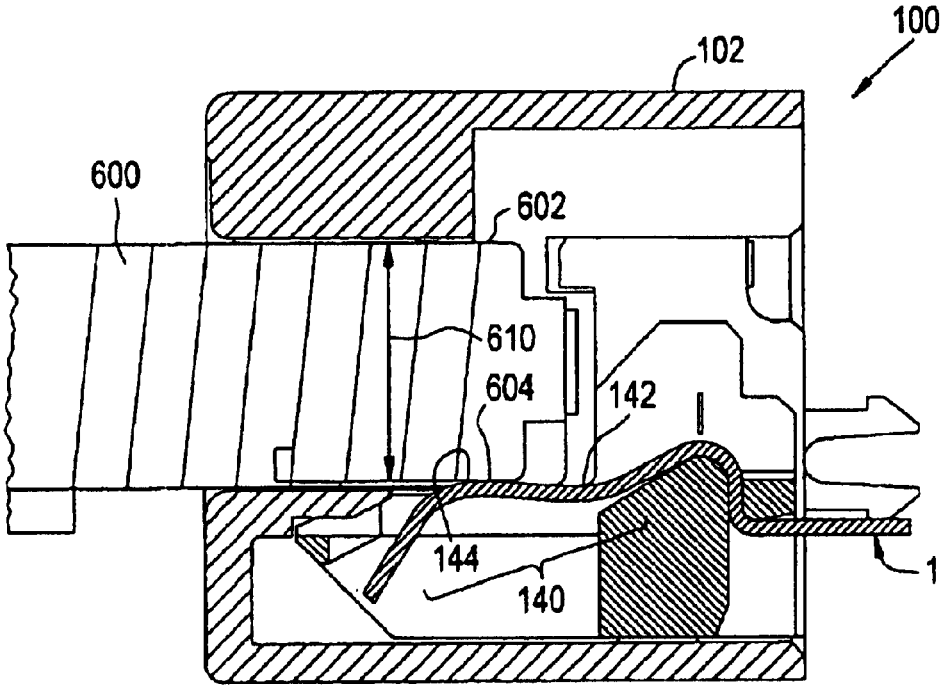
FIG. 9 is a cross sectional view of the outlet of FIG. 1 at the first contact position receiving an out-of-specification 8 position plug.

FIG. 9 is a cross sectional view depicting an out-of-specification plug 600. Plug 600 includes a plug top 602 and a plug bottom 604. Plug bottom 604 is also the contact surface for contact 1. A thickness 610 between plug top 602 and plug bottom 604 is 0.254 inches, which is over the upper specification limit of 0.242 inches. This may be created by plug 600 being under-crimped. Plug 600 enters outlet 100 and plug bottom 604 rides over convex portion 144 and enters concave portion 142. Once plug 600 crosses the peak of convex portion 144, deflection of contact 1 is minimized because contact 1 curves away from plug bottom 604. Reverse curve section 140 prevents deformation even when out-of-specification plugs are used.

Figure 10:
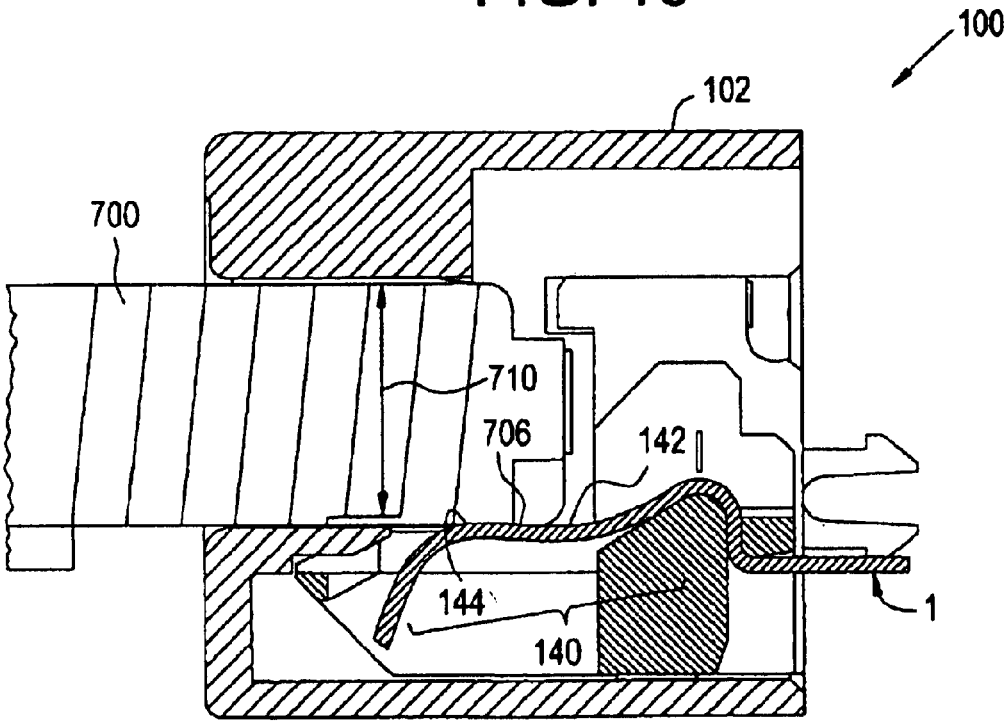
FIG. 10 is a cross sectional view of the outlet of FIG. 1 at the first contact position receiving a 6 position plug.

FIG. 10 is a cross sectional view of outlet 100 depicting a 6 position plug 700 at contact 1 of outlet 100. Plug 700 lacks plug contacts in positions 1 and 8 and a plug housing 706 comes into contact with contact 1. A thickness 710 of plug housing 706 aligned with contact 1 may exceed the thickness for plug contacts and thus, the 6 position plug can deform conventional outlet contacts.

As shown in FIG. 10, as the plug 700 enters outlet 100, plug housing 706 rides over convex portion [142] *144* and enters concave portion [144] *142*. Once plug 700 crosses the peak of convex portion [142] *144*, deflection of contact 1 is minimized because contact 1 curves away from plug housing 706. Reverse curve section 140 prevents deformation when 6 position plugs are used.

As stated above, within outlet 100, contacts 1 and 8 are the same structure and thus, the description described as to contact 1 also applies to contact 8 with respect to plugs 500, 600, and 700.

Figure 11:
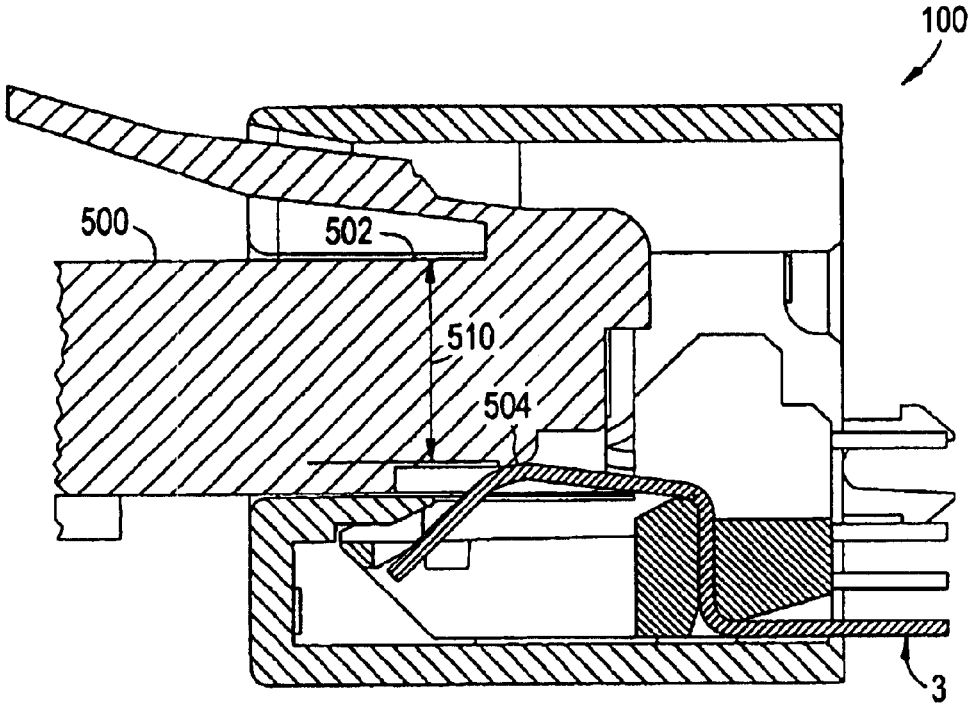
FIG. 11 is a cross sectional view of the outlet of FIG. 1 at the third contact position receiving an in-specification plug.
Figure 12:
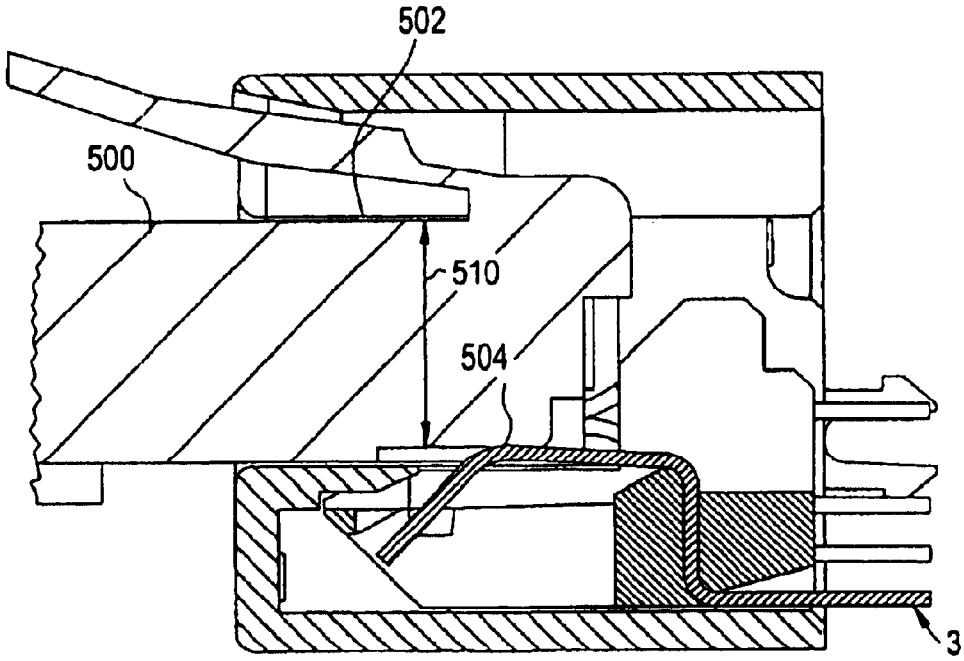
FIG. 12 is a cross sectional view of the outlet of FIG. 1 at the third contact position receiving an in-specification plug.

FIG. 11 depicts a cross sectional view of plug 500 being mated with outlet 100 at contact 3. As explained above, plug 500 has a thickness 510 measured from plug top 502 to plug bottom 504 of 0.232 inches. Plug bottom 504 physically contacts contact 3 as desired. FIG. 12 illustrates plug 500 with a thickness 510 of 0.242 inches between plug top 502 and plug bottom 504. Plug bottom 504 physically contacts contact 3.

Figure 13:
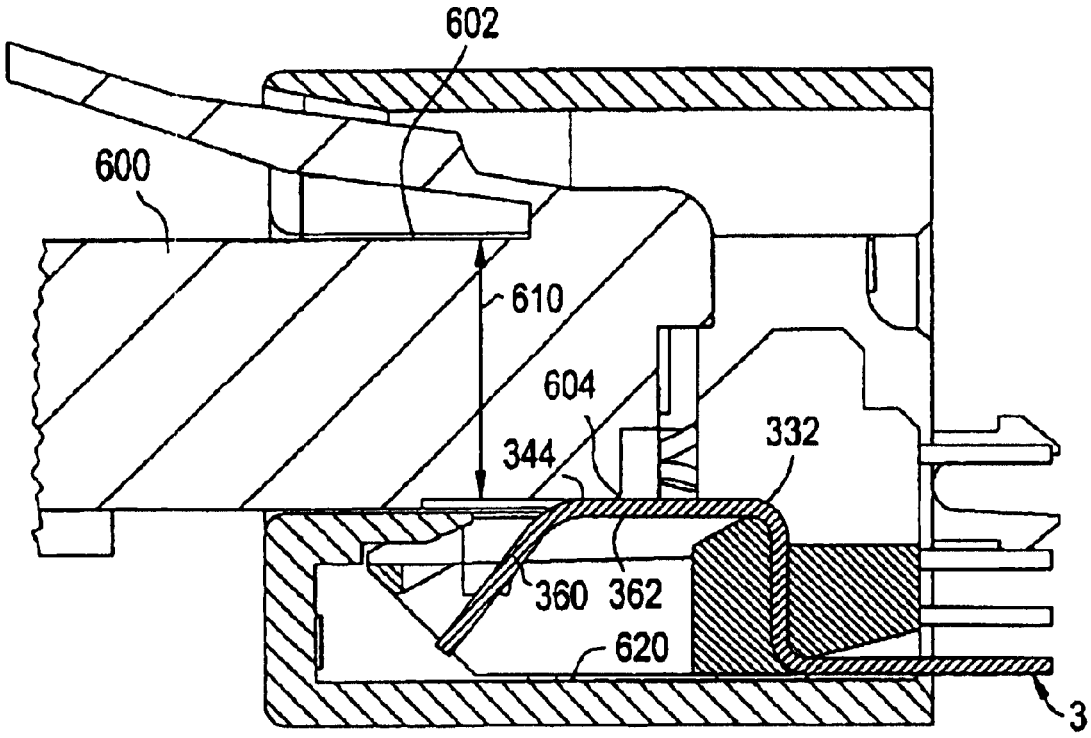
FIG. 13 is a cross sectional view of the outlet of FIG. 1 at the third contact position receiving an out-of-specification 8 position plug.

FIG. 13 is a cross sectional view of plug 600. As explained above, plug 600 has a thickness 610 of 0.254 inches between plug top 602 and plug bottom 604, which is over the upper specification limit of 0.242 inches. This may be created by the plug contact being under-crimped.

As shown in FIG. 13, as the plug 600 enters outlet 100, plug bottom 604 travels along the length of contact 3. As plug bottom 604 passes over convex portion 344, plug bottom 604 deflects second slope 362 down towards a base 620. Due to the angle between the first slope 360, second slope 362, and bend section 332, second slope 362 becomes horizontal and plug bottom 604 rides along second slope 362, which is now in the horizontal position. As plug 600 is inserted and second slope 362 deflects to the horizontal position, second slope 362 continues to remain horizontal and no further deflection of contact 3 occurs. This prevents contact 3 from being deformed by out-of-specification plugs.

As stated above, within outlet 100, contacts 3, 5, and 7 are the same structure and thus, the description described as to contact 3 also applies to contact 5 and 7 with respect to plugs 500 and 600.

With respect to contacts 2, 4, and 6, convex portion 244 also deflects when plugs 500 and 600 are inserted into outlet 100. Convex portion 244 deflects so that contacts 2, 4, and 6 are not damaged when plugs 500 and 600 are inserted into outlet 100.

The invention being thus described, it will be obvious that the same may be varied in many ways. Such variations are not to be regarded as departure from the spirit and scope of the invention, and all such modifications as would be obvious to one skilled in the art are intended to be included within the scope of the invention.

What is claimed is:

1. A telecommunications outlet comprising:

a housing that is shaped to receive a plug, said housing having a support disposed within said housing; and a first contact having a first end that is disposed under a lip of said housing, a termination end that exits a rear of said housing, and a bend section, said bend section is supported by said support, wherein said first contact includes a first reverse curve section disposed between said first end and said bend section, said first reverse curve section includes a convex portion and a concave portion, said [concave] *convex* portion is configured and dimensioned to have contact with said plug so as to prevent deformation of said contact.

2. The telecommunications outlet of claim 1, wherein *said convex* portion is disposed adjacent to said concave portion.

3. The telecommunications outlet of claim 2, wherein said convex portion includes a first slope and a second slope and said concave portion includes said second slope and a third slope, said concave section disposed adjacent to said bend section, said third slope is configured to deflect to a maximum amount.

4. The telecommunications outlet of claim 1, further comprising a second contact that is supported by said housing, said second contact has a second reverse curve section, wherein said first reverse curve section has a different structure from said second reverse curve section.

5. The telecommunications outlet of claim 4, wherein said first contact and said second contact form a tip and ring pair.

6. The telecommunications outlet of claim 4, further comprising a third contact that is supported by the said housing, said third contact has a curve section.

7. The telecommunications outlet of claim 6, further comprising a fourth contact that is supported by the said housing, said fourth contact is shaped similar to said second contact.

8. The telecommunications outlet of claim 7, further comprising a fifth contact that is supported by said housing, said fifth contact is shaped similar to said third contact.

9. The telecommunications outlet of claim 8, further comprising a sixth contact that is supported by said housing, said sixth contact is shaped similar to said second contact.

10. The telecommunications outlet of claim 9, further comprising a seventh contact that is supported by said housing, said seventh contact is shaped similar to said third contact.

11. The telecommunications outlet of claim 10, further comprising an eighth contact that is supported by said housing, said eighth contact is shaped similar to said first contact.

12. The telecommunications outlet of claim 1, wherein said plug is an in-specification plug.

13. The telecommunications outlet of claim 1, wherein said plug is an out-of-specification plug.

14. The telecommunications outlet of claim 1, wherein said outlet is a RJ-45 outlet having at least 8 contacts.

15. The telecommunications outlet of claim 1, wherein said first reverse curve section includes a first slope defined by a first angle formed from a horizontal direction, a second slope defined by a second angle formed from said horizontal direction, a third slope defined by a third angle formed from said horizontal direction.

16. The telecommunications outlet of claim 15, wherein said first slope and said second slope form said convex portion, and said second slope and said third slope form said concave portion, said second slope is approximately 12 degrees to approximately 20 degrees oriented from said horizontal direction and from a front of said housing that receives said plug.

17. The telecommunications outlet of claim 15, further comprising a second reverse curve section, said second reverse curve section includes a fourth slope defined by a fourth angle formed from said horizontal direction, a fifth slope defined by a fifth angle formed from said horizontal direction, and a sixth slope defined by a sixth angle formed from said horizontal direction.

18. The telecommunications outlet of claim 17, further comprising a curve section, said curve section includes a seventh slope defined by a seventh angle formed from said horizontal direction, and an eighth slope defined by an eighth angle formed from said horizontal direction.

* * * * *